US010397557B2

(12) United States Patent
Vdovin et al.

(10) Patent No.: US 10,397,557 B2
(45) Date of Patent: Aug. 27, 2019

(54) DISPLAY DEVICE WITH DIRECTIONAL CONTROL OF THE OUTPUT, AND A BACKLIGHT FOR SUCH A DISPLAY DEVICE AND A LIGHT DIRECTION METHOD

(71) Applicant: KONINKLIJKE PHILIPS N.V., Eindhoven (NL)

(72) Inventors: Olexandr Valentynovych Vdovin, Eindhoven (NL); Eibert Gerjan Van Putten, Eindhoven (NL); Bart Kroon, Eindhoven (NL); Mark Thomas Johnson, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2 days.

(21) Appl. No.: 15/559,093

(22) PCT Filed: Mar. 16, 2016

(86) PCT No.: PCT/EP2016/055614
§ 371 (c)(1),
(2) Date: Sep. 18, 2017

(87) PCT Pub. No.: WO2016/150778
PCT Pub. Date: Sep. 29, 2016

(65) Prior Publication Data
US 2018/0249149 A1    Aug. 30, 2018

(30) Foreign Application Priority Data
Mar. 26, 2015   (EP) .................................. 15161024

(51) Int. Cl.
F21V 8/00    (2006.01)
G09G 3/00   (2006.01)
(Continued)

(52) U.S. Cl.
CPC ............. *H04N 13/32* (2018.05); *G02B 6/003* (2013.01); *G02B 6/0033* (2013.01);
(Continued)

(58) Field of Classification Search
CPC ..... F21V 5/005; F21Y 2115/10; G02B 5/021; G02B 5/045; G02B 6/0011; G02B 6/0013;
(Continued)

(56) References Cited

U.S. PATENT DOCUMENTS 5,070,431 A * 12/1991 Kitazawa ............. G02B 6/0021
362/23.15
5,453,855 A *  9/1995 Nakamura ........... G02B 6/0051
349/58
(Continued)

FOREIGN PATENT DOCUMENTS

KR    20010037757 A  *  5/2001

OTHER PUBLICATIONS

Hou et al "A Full Description of a Scalable Microfabrication Process for Arrayed Electrowetting Microprisms" J. Micromech. Microeng. 20 (2010).
(Continued)

*Primary Examiner* — Alexander K Garlen

(57) ABSTRACT

A display backlight comprises an edge-lit lightguide having an array of light out-coupling structures to enable light to escape from the lightguide at the location of the light out-coupling structures. A light source arrangement is used for providing light into the lightguide at one or both of the opposite side edges. The light source arrangement is controllable to provide a selected one of at least first and second light outputs into the lightguide, the two light outputs having a different angle to the general plane of the lightguide and resulting in light which escapes from the lightguide with a
(Continued)

different range of exit angles. In this way, a directional backlight output is enabled, based on the way light is coupled into a lightguide. This provides a simple structure only requiring control of the light provided to the lightguide. The backlight may for example enable an auto stereoscopic display to be formed without the need for a lenticular array.

16 Claims, 9 Drawing Sheets

(51) Int. Cl.
| | | |
|---|---|---|
| *G09G 3/34* | (2006.01) | |
| *G02B 27/22* | (2018.01) | |
| *H04N 13/30* | (2018.01) | |
| *H04N 13/32* | (2018.01) | |
| *H04N 13/398* | (2018.01) | |

(52) U.S. Cl.
CPC ......... *G02B 6/0053* (2013.01); *G02B 6/0091* (2013.01); *G02B 27/225* (2013.01); *G02B 27/2264* (2013.01); *G09G 3/003* (2013.01); *G09G 3/3406* (2013.01); *H04N 13/398* (2018.05); *G02B 6/0068* (2013.01); *G09G 2358/00* (2013.01); *H04N 2013/405* (2018.05); *H04N 2213/001* (2013.01)

(58) Field of Classification Search
CPC .... G02B 6/0016; G02B 6/002; G02B 6/0033; G02B 6/0038; G02B 6/0025; G02B 6/0053; G02B 6/0055; G02B 6/0073; G02B 6/0091; G02F 1/133603; G02F 1/133615; H04N 13/32; H04N 13/398
See application file for complete search history.

(56) References Cited

U.S. PATENT DOCUMENTS

| | | | | |
|---|---|---|---|---|
| 5,584,556 A * | 12/1996 | Yokoyama | ............ | G02B 6/0036 349/62 |
| 5,718,497 A * | 2/1998 | Yokoyama | ............ | G02B 6/0036 362/23.15 |
| 6,048,071 A * | 4/2000 | Sawayama | ............ | G02B 6/0018 349/63 |
| 6,239,851 B1 * | 5/2001 | Hatazawa | ............ | G02B 6/0056 349/62 |
| 6,435,687 B1 * | 8/2002 | Fukiharu | ............ | G02B 6/0038 349/65 |
| 7,518,663 B2 | 4/2009 | Cornelissen | | |
| 7,619,604 B2 | 11/2009 | Karman et al. | | |
| 7,626,643 B2 | 12/2009 | Ijzerman et al. | | |
| 7,645,048 B2 * | 1/2010 | Iwasaki | ................ | G02B 6/0073 362/608 |
| 7,690,831 B2 * | 4/2010 | Mori | .................... | G02B 6/0013 362/612 |
| 7,876,397 B2 | 1/2011 | Krijn et al. | | |
| 7,980,746 B2 * | 7/2011 | Tsuchiya | ................ | G02B 6/003 362/606 |
| 8,348,490 B2 * | 1/2013 | Yuuki | .................. | G02B 6/0036 362/606 |
| 8,523,388 B2 * | 9/2013 | Wu | ........................ | F21V 7/0016 362/240 |
| 8,646,960 B2 | 2/2014 | Aho et al. | | |
| 8,659,537 B2 * | 2/2014 | Kong | .................... | G09G 3/342 315/224 |
| 8,950,873 B2 * | 2/2015 | Okamoto | .................. | G02F 1/29 353/85 |
| 9,261,641 B2 * | 2/2016 | Sykora | ................ | G02B 3/0062 |
| 9,519,097 B2 * | 12/2016 | Chen | .................. | G02B 6/0026 |
| 2002/0080596 A1 * | 6/2002 | Fukiharu | ............. | G02B 6/0038 362/601 |
| 2004/0179154 A1 * | 9/2004 | Hong | ..................... | G02B 6/005 349/113 |
| 2005/0185394 A1 * | 8/2005 | Sakamoto | ........... | G02B 6/0026 362/133 |
| 2005/0264717 A1 | 12/2005 | Chien et al. | | |
| 2006/0007704 A1 * | 1/2006 | Mori | .................... | G02B 6/0013 362/613 |
| 2006/0066218 A1 | 3/2006 | Yamaguchi et al. | | |
| 2008/0084512 A1 | 4/2008 | Brott et al. | | |
| 2008/0151577 A1 * | 6/2008 | Li | ........................ | G02B 6/0016 362/620 |
| 2009/0141517 A1 * | 6/2009 | Parker | ................... | A61M 21/02 362/619 |
| 2009/0190070 A1 * | 7/2009 | Nagata | .................. | G02B 6/003 349/65 |
| 2010/0157625 A1 * | 6/2010 | Mai | ...................... | G02B 6/0036 362/613 |
| 2010/0231862 A1 * | 9/2010 | Itoh | .................... | G02B 27/0994 353/31 |
| 2011/0002142 A1 * | 1/2011 | Yuuki | .................. | G02B 6/0036 362/606 |
| 2011/0285927 A1 | 11/2011 | Schultz et al. | | |
| 2012/0008067 A1 * | 1/2012 | Mun | ..................... | G02B 6/003 349/65 |
| 2012/0127573 A1 | 5/2012 | Robinson et al. | | |
| 2012/0134175 A1 * | 5/2012 | Kunimasa | ............. | G02B 6/0016 362/602 |
| 2012/0195072 A1 | 8/2012 | Minami | | |
| 2012/0314145 A1 | 12/2012 | Robinson | | |
| 2013/0250616 A1 * | 9/2013 | Ha | ...................... | G02B 6/0091 362/613 |
| 2013/0308339 A1 | 11/2013 | Woodgate et al. | | |
| 2014/0118825 A1 | 5/2014 | Shikii et al. | | |
| 2014/0340930 A1 * | 11/2014 | Nakagome | ........... | G02B 6/0036 362/607 |
| 2015/0029750 A1 * | 1/2015 | Wang He | ............. | G02B 6/0016 362/608 |

OTHER PUBLICATIONS

Bang et al "A High Quality Steerable Planar Colimator" SID Digest (2014).
J. Geng "Three Dimensional Display Technologies" Advances in Optics and Photonics 5 p. 456-535 (2013).

* cited by examiner

DISPLAY DEVICE WITH DIRECTIONAL CONTROL OF THE OUTPUT, AND A BACKLIGHT FOR SUCH A DISPLAY DEVICE AND A LIGHT DIRECTION METHOD

CROSS-REFERENCE TO PRIOR APPLICATIONS

This application is the U.S. National Phase application under 35 U.S.C. § 371 of International Application No. PCT/EP2016/055614, filed on Mar. 16, 2016, which claims the benefit of EP Patent Application No. EP 15161024.3, filed on Mar. 26, 2015. These applications are hereby incorporated by reference herein.

FIELD OF THE INVENTION

This invention relates to a backlight for a display device, which is particularly suitable for a display device in which images are displayed in a narrow range of output directions. One example is an autostereoscopic display device which comprises a display panel having an array of display pixels, and an arrangement for directing different views to different physical locations. Another example is a privacy display in which a display image is provided only in the direction of a viewer.

BACKGROUND OF THE INVENTION

A known autostereoscopic display device comprises a two-dimensional liquid crystal display panel having a row and column array of display pixels (wherein a "pixel" typically comprises a set of "sub-pixels", and a "sub-pixel" is the smallest individually addressable, single-color, picture element) acting as an image forming means to produce a display. An array of elongated lenses extending parallel to one another overlies the display pixel array and acts as a view forming means. These are known as "lenticular lenses". Outputs from the display pixels are projected through these lenticular lenses, which function to modify the directions of the outputs.

The lenticular lenses are provided as a sheet of lens elements, each of which comprises an elongate partial-cylindrical (e.g. semi-cylindrical) lens element. The lenticular lenses extend in the column direction of the display panel, with each lenticular lens overlying a respective group of two or more adjacent columns of display sub-pixels.

Each lenticular lens can be associated with two columns of display sub-pixels to enable a user to observe a single stereoscopic image. Instead, each lenticular lens can be associated with a group of three or more adjacent display sub-pixels in the row direction. Corresponding columns of display sub-pixels in each group are arranged appropriately to provide a vertical slice from a respective two dimensional sub-image. As a user's head is moved from left to right a series of successive, different, stereoscopic views are observed creating, for example, a look-around impression.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of rows and columns of display sub-pixels 5. For the sake of clarity, only a small number of display sub-pixels 5 are shown in the Figure. In practice, the display panel 3 might comprise about one thousand rows and several thousand columns of display sub-pixels 5. In a black and white display panel a sub-pixel in fact constitutes a full pixel. In a color display a sub-pixel is one color component of a full color pixel. The full color pixel, according to general terminology comprises all sub-pixels necessary for creating all colors of a smallest image part displayed. Thus, e.g. a full color pixel may have red (R) green (G) and blue (B) sub-pixels possibly augmented with a white and/or yellow sub-pixel and/or with one or more other elementary colored sub-pixels. The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display sub-pixel 5 comprises opposing electrodes on the substrates, with the intervening liquid crystal material there between. The shape and layout of the display sub-pixels 5 are determined by the shape and layout of the electrodes. The display sub-pixels 5 are regularly spaced from one another by gaps.

Each display sub-pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display sub-pixels 5 being driven to modulate the light and produce the display. The backlight 7 has side edges 7a and 7b, a top edge 7c and a bottom edge 7d. It has a front face from which light is output.

The display device 1 also comprises a lenticular sheet 9, arranged over the display side of the display panel 3, which performs a light directing function and thus a view forming function. The lenticular sheet 9 comprises a row of lenticular elements 11 extending parallel to one another, of which only one is shown with exaggerated dimensions for the sake of clarity.

The lenticular elements 11 are in the form of convex (semi-) cylindrical lenses each having an elongate axis 12 extending perpendicular to the cylindrical curvature of the element, and each element acts as a light output directing means to provide different images, or views, from the display panel 3 to the eyes of a user positioned in front of the display device 1.

A lenticular type imaging arrangement gives rise to multiple viewing cones. Within each cone, the set of different views is repeated. For multi-viewer displays, this is an advantage as it enables the full field of view to be filled with views. It may be especially advantageous for moving viewers to use a single viewing cone for example in a head tracking system which tracks the location of a single or small number of viewers.

The display device has a controller 13 which controls the backlight and the display panel.

The autostereoscopic display device 1 shown in FIG. 1 is capable of providing several different perspective views in different directions, i.e. it is able to direct the pixel output to different spatial positions within the field of view of the display device. In particular, each lenticular element 11 overlies a small group of display sub-pixels 5 in each row, where, in the current example, a row extends perpendicular to the elongate axis of the lenticular element 11. The lenticular element 11 projects the output of each display sub-pixel 5 of a group in a different direction, so as to form the several different views. As the user's head moves from left to right, his/her eyes will receive different ones of the several views, in turn.

A common issue for the lenticular-based autostereoscopic displays is that there is a reduced resolution in the 3D mode. Using multiple pixels under each lenticular lens element means that several views are generated simultaneously. This reduces the available resolution of autostereoscopic displays in 3D mode compared to the native resolution of the 2D display panel.

One known method to avoid this loss of panel resolution in the 3D mode is to generate the required different views in a time-sequential manner. This approach can be done for instance with a directional backlight component, which generates collimated light at different viewing angles at different moments of time.

If the switching speed of the backlight directionality is sufficiently fast and the generated light output directions cover the necessary range for multiple views, such a backlight can be employed to create a 3D display without requiring a lens, and with the full native resolution of the panel.

There are known examples of backlights which provide directional outputs. A two-view directional backlight concept is described in US 2009/7518663. The display device includes a display panel, a light redirection element for directing light through the display panel, and a light guide for directing light towards the light redirection element. Two light sources are coupled to the light guide to input light into the light guide in two directions. The light redirection element has a first groove structure and the light guide has a second groove structure so that light from the light sources are directed through the display panel with two angular distributions. The grooved light out-coupling structures are applied on the top of the lightguide.

Light is alternatively sent to the left and to the right eye of the observer synchronously with respective switching between images for the left and the right eye using a fast switching LCD.

Another example is a two-view directional backlight commercially available from the company 3M (trade mark). The design comprises a backlight component with prismatic groove out-coupling structures at the backplane of a lightguide, light sources situated at the two different sides of a lightguide, a light re-direction film and an LCD panel. The whole setup generates two views projected at different directions into the eyes of the observer. The views are generated time-sequentially, depending on the light source operating at one or another side of the lightguide.

An alternative approach is to use a backlight which generates spaced thin line light sources, with a display panel at a fixed distance from light sources, such that the light exiting each light source propagates at a different angular direction through different panel pixel elements.

Other known directional backlight designs use arrays of direct emitting fixed light sources and associated optical elements.

An array of light sources can for example be realized with a regular backlight and an LCD panel functioning as active barrier on top of the backlight, and a lenticular lens. A dynamic light source is then in the focal plane of the lens in order to generate a collimated output. This design usually results in low efficiency and reduced brightness. A similar concept may use fixed switchable OLED stripes and a lenticular lens on top.

FIG. 2 shows the use of a collimated backlight for controlling the direction from which a view can be seen. The backlight 7 comprises an array 30 of striped light emitters, a positive lens array 32 and a replica structure 34 between the lens array and the emitters. The lens array 32 collimates the light coming from the array 30 of thin light emitting stripes. Such a backlight can be formed from a series of emissive elements, such as lines of LEDs or OLED stripes. The extracted light from the emissive elements is in the form of an array of thin light emitting stripes spaced at around the pitch of the lens structure.

These solutions generally use active source steering (multiple addressable light sources or else a backlight combined with active barriers) in combination with fixed optical elements. They are therefore structurally complex.

Edge lit lightguides (otherwise known as waveguides) for backlighting and front-lighting of displays are inexpensive and robust. It would therefore be advantageous to base a collimated backlight component around the edge lit technology. However the known edge lit lightguides are designed to provide maximum uniformity of light output across the entire surface of the lightguide and are therefore not designed for generating an array of thin light stripes spaced at around the pitch of a combined lens.

FIG. 3 shows a schematic image of an edge lit lightguide 40. The lightguide comprises a waveguide material, such as a slab of solid material with a top face 40a, a bottom face 40b and lateral edges 40c. There are top and bottom edges which cannot be seen in FIG. 3, as the cross section of FIG. 3 is taken in the lateral side-to-side direction. The lightguide is generally rectangular in plan view. The top and bottom edges of the lightguide (at the top and bottom sides of the rectangle) are aligned to correspond to the top and bottom of the associated display, and the lateral edges (at the left and right sides of the rectangle) are aligned to correspond to the left and right sides of the associated display.

From the left side in FIG. 3, light is coupled in from a light source 42 and at the bottom of the lightguide several out-coupling structures 44 are placed. Light propagates under an angle $\theta_{in}$ inside the lightguide with height H. The out-coupling structures 44 in this example are drawn as half prisms with a half top angle σ, height h, and a width w.

The lightguide is formed as a dielectric slab made out of e.g. glass or polycarbonate. In the slab, total internal reflection at the borders keeps the light confined while the light propagates. The edges of the slab are typically used to couple in light and the small light out-coupling structures 44 locally couple light out of the lightguide.

US 2012/0314145 and US 2013/0308339 disclose a backlight for an autostereoscopic display using a special design of lightguide, which has a reflecting end face which functions as a lens. Different light sources provide light to the lightguide in different directions, and the lens functions create a collimated path within the lightguide in a particular direction. This is coupled out from the lightguide to create a particular backlight output direction. This requires a complicated lightguide structure.

The invention is based on the use of a more basic lightguide type backlight for use in an autostereoscopic display or privacy display, in particular to enable generation of a directional output, and in which time sequential operation is used to enable higher spatial resolution. A lightguide design is desired which can be kept thin and lightweight.

SUMMARY OF THE INVENTION

The invention is defined by the claims.

According to an example, there is provided a display backlight, comprising:

a lightguide having having top and bottom parallel faces, and a pair of opposite side edges, wherein the light output is from the top face;

a light source arrangement for providing light into the lightguide at one or both of the opposite side edges; and an array of light out-coupling structures formed at the top or bottom parallel face for redirecting light so that it escapes from the lightguide at the location of the light out-coupling structures, wherein the light source arrangement is controllable to provide a selected one of at least first and second light outputs entering into the lightguide, the first and second light outputs being at least partially collimated and being adapted to enter light into the lightguide with a different angular direction of elevation with respect to the plane of the top and bottom parallel faces and across the edge-to-edge direction, wherein the first and second light outputs entering into the lightguide result in different light output angles from the top face.

This backlight enables control of the output direction using collimated light sources, by controlling an in-coupling direction into the lightguide. In particular an angle of elevation is controlled, i.e. with respect to the plane of the top and bottom surfaces. This control can be achieved by light source positioning or by optical elements. The light coupled into the lightguide at different propagation directions is extracted by the light out-coupling structures into different viewing directions. By scanning the directional control, multiple directional views from the backlight can be generated.

The first and second light outputs may enter the lightguide at the same side, or they may enter at opposite sides. Alternatively, each light output may be provided to both opposite side edges.

The backlight design may make use of a simple design of lightguide. It has parallel top and bottom faces (ignoring the light out-coupling structures), so is of constant thickness, which means the manufacture is simple and conventional. The plan view shape of the lightguide is also conventional for example a rectangular lightguide with straight edges.

The backlight is suitable for use in an autostereoscopic 3D display utilizing full native resolution of the 2D panel. The directional backlight design may be used to generate multiple views time-sequentially.

The first and second light output (from the the source arrangement) preferably result in light which escapes from the lightguide with a different range of exit angles in a normal plane extending between the side edges. In this way, different lateral viewing angles are created, when the side edges at at the lateral sides of the backlight. The range of exit angles resulting from the first light output is preferably non-overlapping with the range of exit angles resulting from the second light output. In this way, discrete non-overlapping viewing directions are created.

The first and second light outputs are preferably collimated in the direction perpendicular to the plane of the top and bottom faces and in the plane extending in the edge-to-edge direction (i.e. in a plane with the orientation of the cross section of FIG. 2). This collimation in one plane/ direction may be described as "partial" collimation. When the light out-coupling structures extend perpendicularly to this plane, it defines the relevant angles which govern the escape of light from the lightguide. The collimation may for example give a range of beam angles in that plane less than 4 degrees, or preferably even less for example less than 3 degrees or less than 2 degrees. The collimation in a plane parallel to the top and bottom faces is not required, since spread of the range of beam angles in this plane allows the light output to spread to cover the full light output area of the backlight.

The light out-coupling structures for example comprise prismatic strips which extend parallel to the side edges. They may extend fully from the top edge to the bottom edge. They are then for providing lateral beam direction control, which is of particular interest for autostereoscopic displays.

In a first example, the light source arrangement comprises at least first and second light sources, which are mounted at different angles to the plane of the top and bottom parallel faces. By physically mounting the light sources at different angles, the light input angle to the lightguide may be controlled.

In a second example, the light source arrangement comprises at least first and second light sources, each having an associated beam shaping element for setting an light output angle to the plane of the top and bottom parallel faces. The light sources may then be mounted in the same way, and the light output angle is controlled optically rather than mechanically.

The beam shaping elements may be static, so that each light source is dedicated to providing a specific light input angle into the lightguide. The beam shaping elements may then comprise prismatic structures designed for a specific light output angle relative to the plane of the top and bottom parallel faces.

The beam shaping elements may instead be dynamic, so that a light source can be scanned between different light output angles, thereby increasing the optical efficiency. The beam shaping elements may then comprise electrowetting prism devices. This also means that the same physical light source provides the first and second light outputs (at different times) and these light outputs comprise different modes of operation of the shared light source.

In another example, the light source arrangement comprises at least first and second light sources, each comprising a light emitter array and an output lens. By selecting which light emitter to activate within the array, a different light output direction may be generated. Thus, in this case, the angular control is based on selecting a physical location in space at which the light output is generated, and the way this physical location interacts with the lens.

A light redirection arrangement may be provided over the top face of the lightguide. This may be used to redirect the angular output from the light out-coupling structures towards the normal, if for example the angular output from the light out-coupling structures is asymmetrically clipped.

The light output angles from the top face may vary as a function of position over the top face such that light reaches a common view point from all positions of the top face. This is used to make views converge towards the eyes of the viewer, in order to avoid dark areas of the display. The variable angles may be achieved using a non-uniform (over the area of the backlight) light redirection arrangement, or by introducing non-uniformity into the design of the light out-coupling structures.

The invention also provides an autostereoscopic display device or a privacy display comprising:

a backlight as defined above; and a display panel having an array of display pixels for producing a display image, the display panel illuminated by the backlight.

The display panel is for example mounted with sides parallel to the side edges of the backlight. This means the backlight angle control gives rise to different lateral output directions. The display panel may then be controlled synchronously with the backlight to time-sequentially output different images for different viewing directions.

For this purpose, the display comprises a controller, and the controller is adapted to operate the display in two modes:

a first mode in which the first light output is provided into the lightguide and the display panel is controlled to display a first image; and a second mode in which the second light output is provided into the lightguide and the display panel is controlled to display a second image, wherein the controller is adapted to implement the first and second modes time-sequentially.

The first and second images may be left-eye and right-eye views of a single image, or else they may be completely unrelated views, for different users.

There may be more than two modes, so that multiple (more than 2) views are provided time sequentially. Each image may also include multiple views at the same time, if light mixing between the different views can be prevented. Thus, there may be time sequential multi-view operation.

The invention also provides a method of controlling the direction of a light output from a backlight, comprising:

providing light into a lightguide which has top and bottom parallel faces, and a pair of opposite side edges, wherein the light is provided to one or both of opposite side edges;

using an array of light out-coupling structures formed at the top or bottom parallel face for redirecting light so that it escapes from the lightguide from the top face at the location of the light out-coupling structures, wherein the method comprises controlling the angular direction of elevation of the light entering the lightguide with respect to the plane of the top and bottom parallel faces across the edge-to-edge direction between at least first and second light outputs each having a different angular direction, wherein the first and second light outputs entering the lightguide result in different light output angles from the top face.

The invention also provides a method of controlling an autostereoscopic display device, comprising:

controlling the direction of light output from a backlight using the method as defined above;

providing the light output from the backlight to a display panel; and controlling the image displayed by the display panel, wherein the display device is thereby operated in two modes:

a first mode in which the first light output enters lightguide and the display panel is controlled to display a first image; and a second mode in which the second light output enters the lightguide and the display panel is controlled to display a second image, wherein the first and second modes are provided time-sequentially.

BRIEF DESCRIPTION OF THE FIGURES

Embodiments of the invention will now be described, purely by way of example, with reference to the accompanying drawings, in which.

DETAILED DESCRIPTION OF THE EMBODIMENTS

The invention provides a display backlight comprising an edge-lit lightguide having an array of light out-coupling structures to enable light to escape from the lightguide at the location of the light out-coupling structures. A light source arrangement is used for providing light into the lightguide at one or both of the opposite side edges. The light source arrangement is controllable to provide a selected one of at least first and second light outputs into the lightguide, each different light output having a different angle to the general plane of the lightguide and resulting in light which escapes from the lightguide with a different range of exit angles. In this way, a directional backlight output is enabled, based on the way light is coupled into a lightguide. This provides a simple structure only requiring control of the light provided to the lightguide. The backlight may for example enable an autostereoscopic display to be formed without the need for a lenticular array.

The invention is based on an analysis of the characteristics of the optical output from a lightguide backlight.

For a planar lightguide with material having a refractive index n, light rays propagate inside the lightguide with the angles of incidence α within the range $$\theta_c < \alpha < 90° \quad (1)$$

where $\theta_c = \sin^{-1}(1/n)$.

A typical way of extracting the light from the lightguide is to use out-coupling structures, for example prismatic structures at the back plane of the lightguide.

Figure 1:
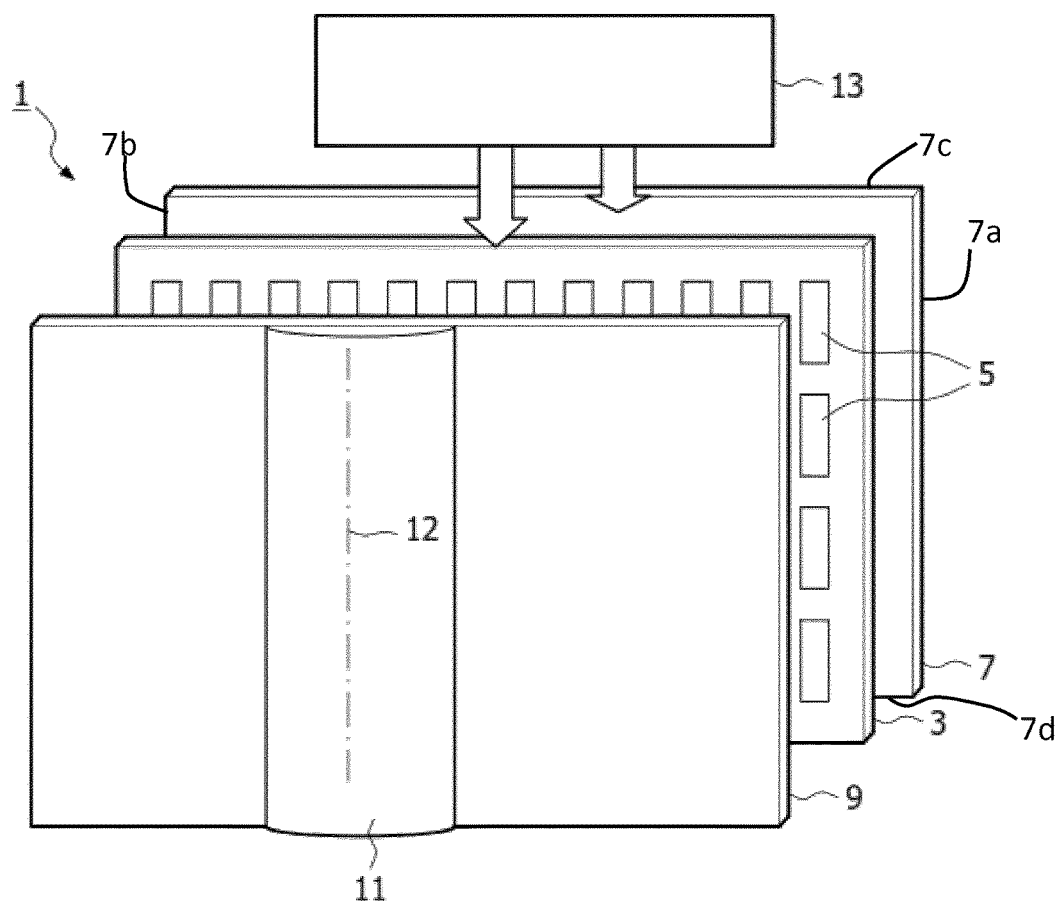
FIG. 1 is a schematic perspective view of a known autostereoscopic display device.
Figure 2:
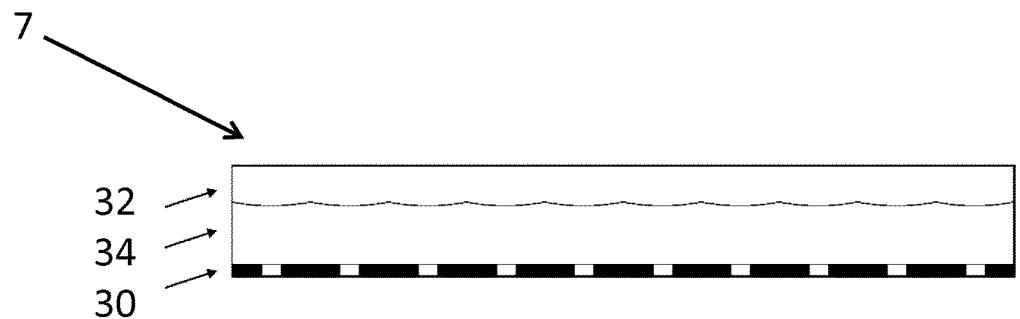
FIG. 2 shows a known directional backlight design using striped emitters.
Figure 3:
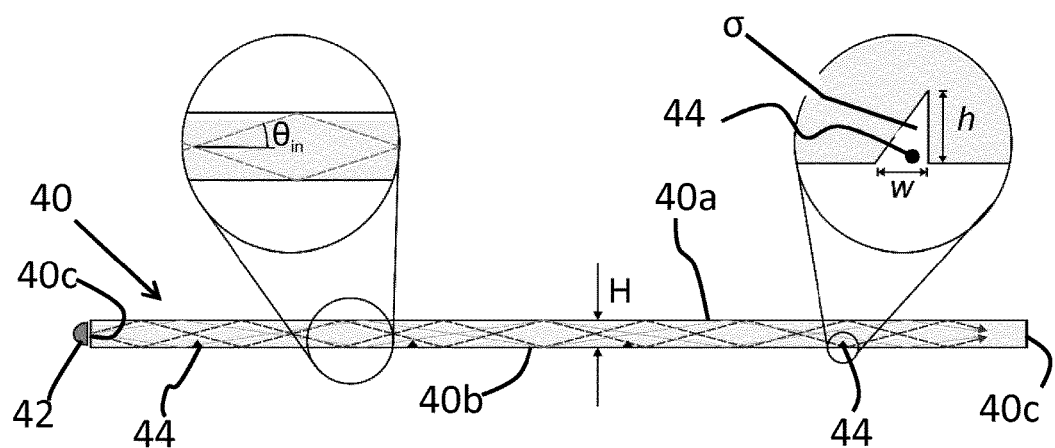
FIG. 3 shows a known backlight design using an edge-lit lightguide.
Figure 4:
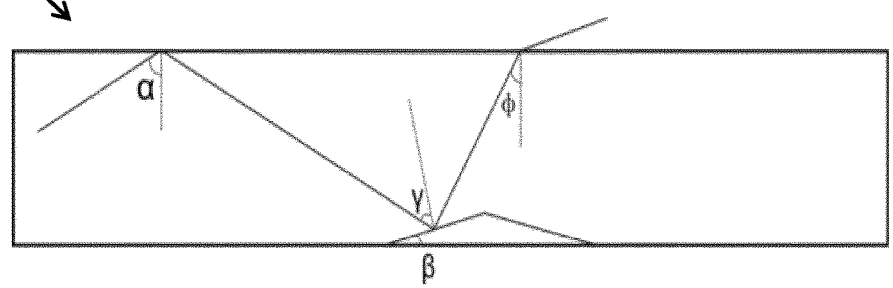
FIG. 4 is used to provide an analysis of the optical function of the lightguide of FIG. 3.

The effect of such structures is shown in FIG. 4, with a light out-coupling facet at an angle β to the general plane of the lightguide.

Light thus impinges on the prism facet at an angle:

$$\gamma = \alpha - \beta$$

This light will reflect from the facet when the conditions of total internal reflection (TIR) are satisfied such that $\gamma > \theta_c$.

The angle of incidence on the top surface of the lightguide is:

$$\varphi = 2\gamma - \alpha = \alpha - 2\beta$$

and this ray is extracted out of the lightguide when $$\varphi < \theta_c$$

The combined conditions for β are therefore:

$$\alpha - 2\beta < \theta_c < \alpha - \beta \quad (2)$$

In order to maximize the width of angular range of extracted light, combining equations (2) and (1) results in a condition:

$$2\beta = 90° - \theta_c$$

or equivalently $$\cos(2\beta) = 1/n$$

Figure 5:
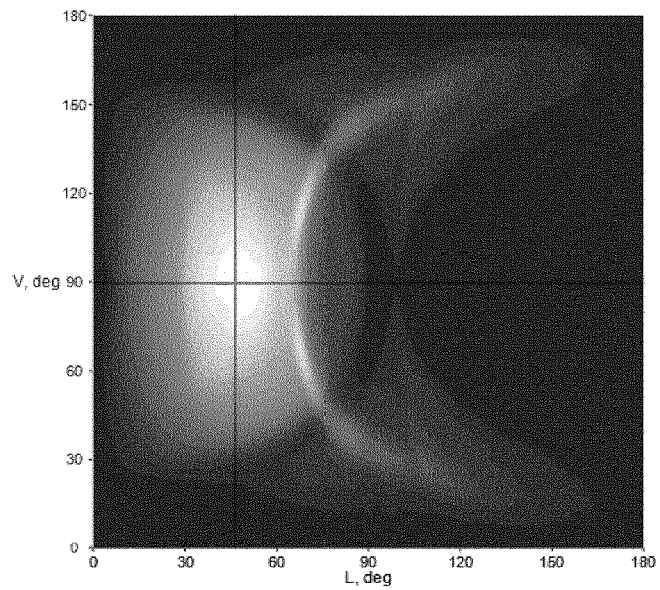
FIG. 5 shows the angular intensity distribution of the outgoing light as a function of vertical angle in the plane perpendicular to the lightguiding direction and the lateral angle in the plane including the lightguiding direction.

The possibility of having a broad distribution range of angles that can be out-coupled from a lightguide is illustrated with results of optical raytrace simulations in FIG. 5.

The figure illustrates the angular intensity distribution of the outgoing light as a function of vertical angle (V, plotted on the y-axis) in the plane perpendicular to the lightguiding direction and the lateral angle (L, plotted on the x-axis) in the plane including the lightguiding direction. The normal direction to the lightguide plane corresponds to L=V=90°).

The intensity is shown as the brightness of the region in the shaded area of the plot.

The lightguide in this example is made of poly(methyl-methacrylate) PMMA with a refractive index of n=1.48 and the out-coupling structures are prismatic grooves where light re-direction occurs via total internal reflection. The apex angle of the prisms is 132 degrees and this satisfies the condition above of cos (2β)=1/n.

Note that the light out-coupling structures may be symmetric or asymmetric prismatic elements.

The light sources are simply Lambertian emitting LEDs without any additional optical components coupled into the lightguide.

In FIG. 5, the left, brighter areas correspond to higher intensity.

Figure 6:
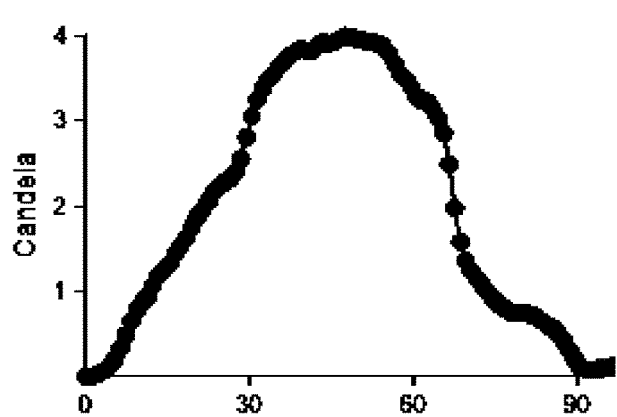
FIG. 6 shows a cross section of the light intensity along the lateral angle with a vertical angle of 90 degrees.

A cross section of the light intensity along the lateral angle L with V=90 degrees is shown in FIG. 6.

The outgoing light has a "flat" intensity part with a maximum at about 45 degrees from the normal. This outgoing light distribution can be redirected into a distribution that is centered on the normal direction (0 degrees) by adding re-direction prisms on the top of the lightguide. The optimum choice of the prism angle can be calculated by the person skilled in the art based on the refractive index of the prism material and the incoming light angular distribution.

For the distribution shown in FIGS. 5 and 6 and the prism made of PMMA material, an optimum prism apex angle of 55 degrees allow to convert the outgoing angular ray distribution into the distribution centered around the normal direction to the backlight.

Figure 7:
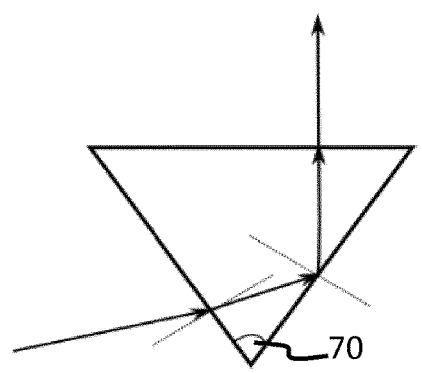
FIG. 7 is used to show a beam redirecting function which can be applied at the output of the backlight.

This redirection function is shown in FIG. 7 for a prism with the 55 degree top angle 70, for redirecting the exiting light ray as shown in FIG. 4. The top angle points towards the top face of the backlight.

Several methods are known to achieve uniform light out-coupling along the entire length of a lightguide. The dimensions of the out-coupling structures can be much smaller than the pitch between them and the size/density of the structure may increase towards the end/middle part of a lightguide.

Some structure imperfections due to limited manufacturing accuracy (rounding of angles, size and geometry variations) may reduce the performance of a directional backlight (such as a decrease of peak intensity, slight broadening or additional maxima outside the desired angular range).

These effects may become visible when the size of imperfections becomes significant compared to the size of the out-coupling structures. In practice the rounding radius of structures using common fabrication methods is in the order of 2 microns or less. This accuracy is sufficient to realize a good performance of a directional backlight with the structure sizes in the order of 25 to 50 microns.

Having a backlight component, which generates collimated light output in multiple view directions may be employed in autostereoscopic displays, and would allow full spatial resolution of a display to be used. Eliminating the lenticular lens, which is typically formed over a thick glass spacer, would allow a significant reduction of the thickness of a 3D display. Operation without any lenticular lens also avoids cone repetition.

For example, for a multi-view autostereoscopic display, the direction in which the backlight emits collimated light may be swept between a number of different view directions.

Figure 8:
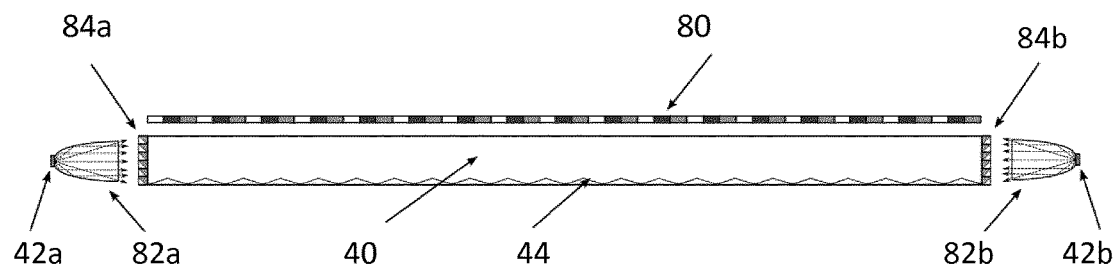
FIG. 8 shows the general backlight design of the invention illuminating a display to form an autostereoscopic display.

FIG. 8 shows a first example of backlight design used with a 3D autostereoscopic display.

The display comprises a lightguide 40 having light out-coupling structures 44, and a display panel 80 over the top. The lightguide is edge illuminated, and two light sources 42a, 42b are shown. Each light source has an associated collimator 82a, 82b. Furthermore, where the light output from each light source enters the edge of the lightguide, a beam shaping element in the form of a light in-coupling or steering arrangement 84a, 84b is provided.

The way light is coupled into the lightguide is used to control the light output direction. By steering the light output, a multi-view autostereoscopic 3D display is enabled which utilizes the full resolution of the 2D panel 80. The light output directions can be altered time-sequentially so that at each time, the full resolution is used.

The display panel 80 is for example mounted with sides parallel to the side edges of the backlight. Thus, FIG. 8 shows a cross section across the display. The light out-coupling features 44 extend parallel to the side edges, so they control the light output direction in the lateral direction. The display does not need a lenticular lens array as all directional control is implemented by the backlight.

The display is controlled to display a sequence of multiple views. At the same time, the directionality of the light output of a backlight is switched between multiple directions (corresponding to the intended viewing direction) synchronously with switching of the display panel.

The light out-coupling features 44 may for example comprise symmetric or asymmetric prismatic elements, and they may be applied on the top plane or on the bottom plane (as shown in FIG. 8) of the lightguide. A uniform out-coupling from the lightguide across the entire panel may be achieved in known manner. For example, the height or density of the structures may be tuned along the lightguide to change the relative out-coupling of each of the structures.

The collimators 82a, 82b ensure that the generated light is sufficiently collimated at least in one direction (perpendicular to the light guide plane). In the other direction the light might be more divergent.

The light out-coupling structures 44 are for example stripes raised above a general plane, and the divergence is allowed in a plane parallel to this general plane. Such divergence will not change the light out-coupling function which depends on the light direction in a plane perpendicular to the length of the stripes, i.e. in the plane of FIG. 8.

The backlight unit generates light in multiple directions by coupling the collimated light into the lightguide under certain defined different angles. The in-coupling of the light can be realized in several ways, for instance by using static or dynamically switched optical elements situated on the side of the lightguide.

Various examples are described below.

The light output from the light sources requires a certain degree of collimation. The angular spread of light that come out of the backlight unit is determined by the directionality of light sources. LEDs with total internal reflection (TIR) collimators, reflectors, compound parabolic concentrators (CPC) or other optical elements may be used as a collimated light source. Alternatively, lasers may be used as the light sources.

The light is collimated preferentially in one direction, namely in the direction perpendicular to the lightguide plane (i.e. in the plane of FIG. 8) and may diverge in directions parallel to the lightguide plane.

The required degree of collimation depends on the application. For a portable autostereoscopic device having two views, the angular width of one view is about 4 degrees, which will translate to a requirement on the collimation of a light source for a certain design of a lightguide. For a multi-view display higher degree of collimation may be required.

The light angular intensity distribution produced by the backlight is determined by a number of parameters: the light source directionality, the beam shaping elements determining the angles of light propagation inside the lightguide, the refractive index of the lightguide material, the refractive index of surrounding media, and the geometry of the out-coupling structures. Depending on the combination of parameters, the light output from the backlight unit can cover the whole 180° angular range or can be confined in a smaller range of angles (e.g. 0° to 90°) from the normal. This may be achieved by clipping the light on one side. Using an additional light-turning optical foil (for instance with light re-direction prisms) then allows the clipped outgoing angular ray distribution to be transformed into a distribution centered around the normal direction to the backlight.

There are multiple ways to control the angular range of the light propagation inside the light guide. One way is to confine and steer the light when it is coupled into the lightguide. This control can be realized either using active optical elements, or passive elements placed in registration with actively switched light sources.

The functionality of the directional backlight is illustrated below by results of optical ray-tracing simulations of a general design comprising active beam shaping optical elements located at the edge of the lightguide, and an additional beam re-direction optical structure layer (i.e. layer 120 described below in connection with FIG. 12).

The light sources are collimated in the direction perpendicular to the lightguide plane (for example collimated to a divergence of 4 degrees or less) and diverging in the lightguide plane. This divergence may have any suitable value for example between 60 degrees and 180 degrees (for example with a 90° angle).

This collimation in one plane to a much greater degree than in an orthogonal plane gives what is termed in this document a "partially collimated" light output.

The light sources are in-coupled via active optical elements for example electrowetting prism elements from one side of the lightguide. The beam shaping prism elements in this example are considered to have the same refractive index as a lightguide material.

Figure 9:
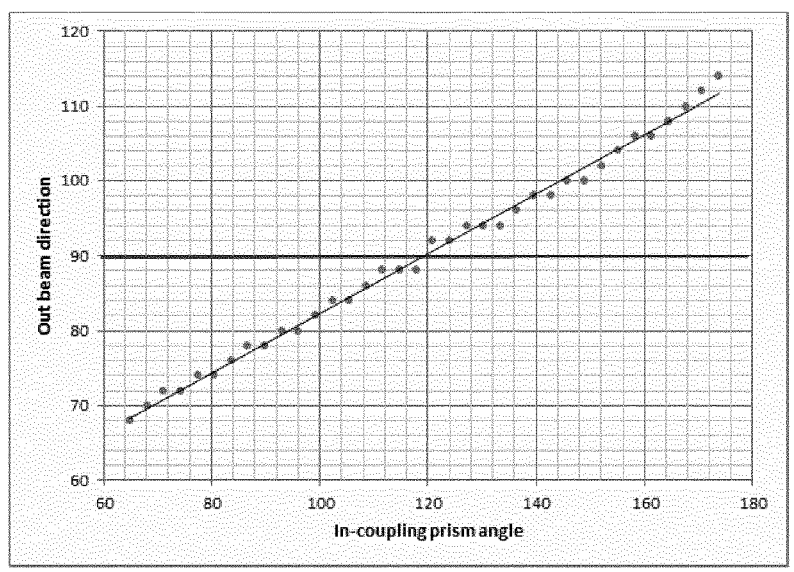
FIG. 9 shows a relationship between a beam direction outgoing from a backlight and an angle with which light is coupled in to the backlight.
Figure 10:
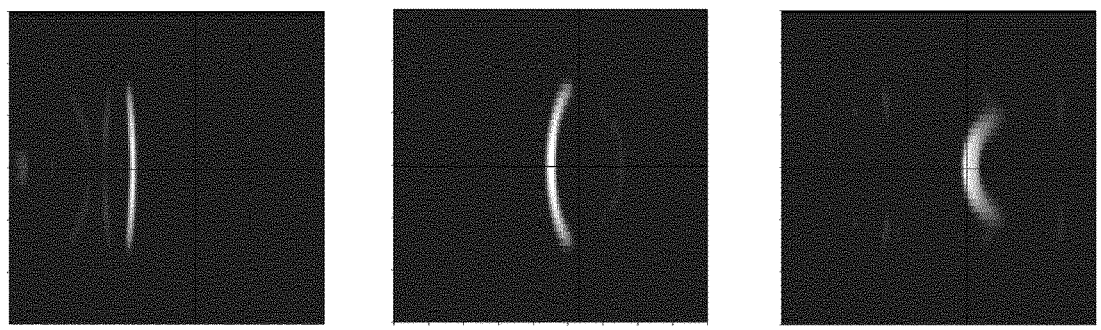
FIG. 10 shows angular intensity distribution maps for three values of the in-coupling prism apex angles of 70°, 120° and 160°.

The simulation results are shown in FIG. 9 and FIG. 10.

FIG. 9 shows the results of ray-trace simulations of beam sweeping functionality of a backlight according to the general design. The beam output direction is shown on the y-axis as a function of the angle of the beam shaping prismatic elements on the side of a lightguide (this angle is the x-axis).

The angular intensity distribution maps for three values of the beam shaping (in-coupling) prism apex angles of 70°, 120° and 160° are shown in FIG. 10, using the same axes as in FIG. 5.

Figure 11:
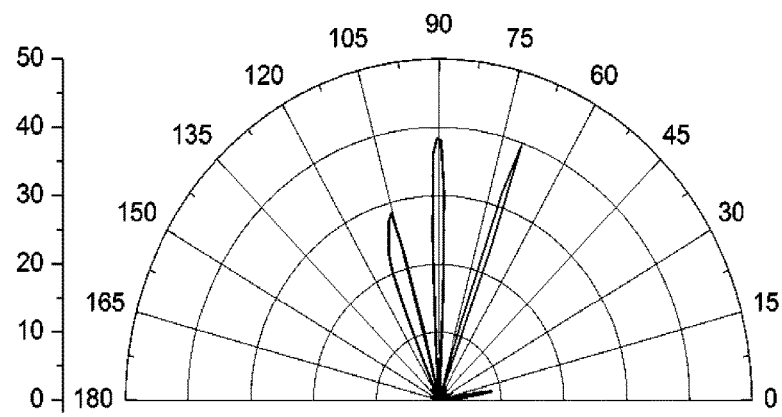
FIG. 11 shows the angular light intensity distribution of the three simulations of FIG. 10 in graphic form instead of using an intensity map.

FIG. 11 shows the angular light intensity distribution of the three simulations of FIG. 10 in a polar plot instead of using an intensity map.

The results illustrate the possibility of tuning the angles of generated views in the range from 70° to 110°, which correspond to angular tuning range of ±20° from the normal direction to the backlight.

At one side of the range of angular tuning (larger angles) the outgoing width of the light is slightly broader and the view shows more distortion when the display is tilted in the plane perpendicular to the light guiding direction (i.e. V deviates from 90°). These kind of distortions can be significantly reduced in a design when half of the views are generated by the light sources and optical elements situated on the different sides of a display.

A first embodiment will now be described in more detail, with reference to FIG. 12.

In this first embodiment, the light sources for different light output directions are arranged at different angles with respect to the general plane of the lightguide, i.e. different angles of elevation. Equivalently, they are arranged at different angles with respect to the edge face at which the light is coupled in to the lightguide.

Figure 12:
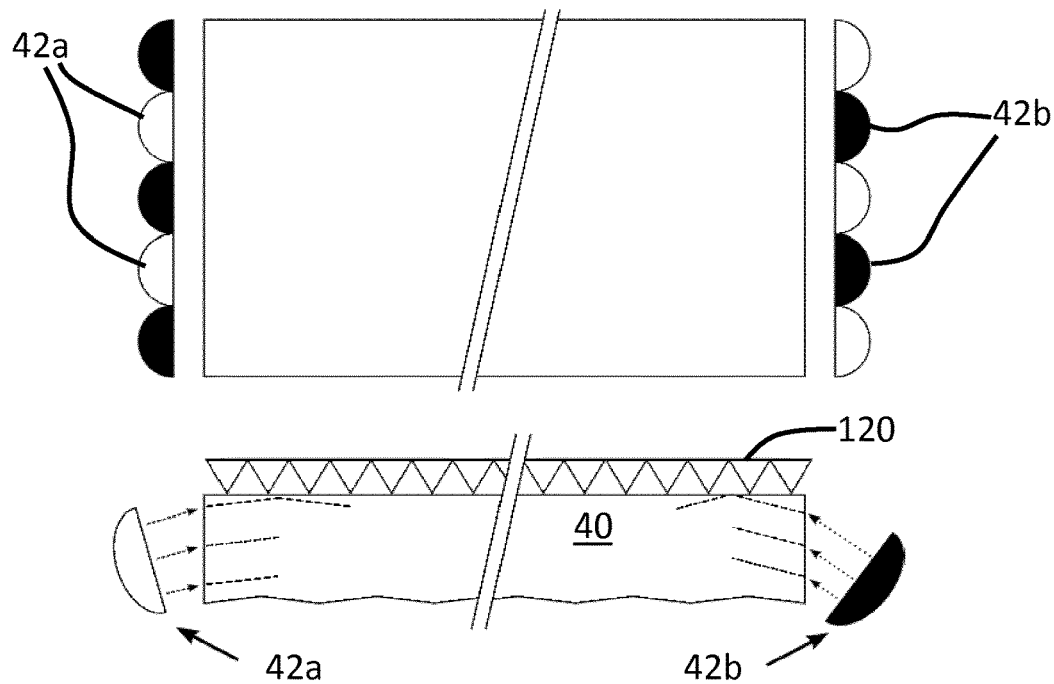
FIG. 12 shows a first more detailed example of backlight design.

FIG. 12 shows a plan view and a cross sectional view and shows one set of light sources 42a with one angle of elevation or tilt, and another set of light sources 42b with a different angle of elevation or tilt.

The light is in-coupled to the lightguide at different light propagation angles, by arranging collimated light sources at a certain angle with respect to the in-coupling edge of the lightguide 40. At least two different angular orientations of light sources are provided for example one fixed angle at one side and another fixed angle at another side of the lightguide. This allows for at least two main propagation directions of light generated by the backlight unit.

Depending on the geometry and the types of the light out-coupling structures within the lightguide, a light re-direction film 120 may be required to redirect the light into the proper direction. The directions of light propagation in combination with the light redirection arrangement 120 will determine outgoing angles for the generated views.

Synchronization of images displayed by a display panel with turning on/off of the light sources of different types responsible for propagation of different views enables a time-sequential multi-view display to be realized.

A second embodiment will now be described in more detail, with reference to FIG. 13.

In this second embodiment, the light sources for different light output directions have optical beam shaping elements 130a, 130b. These are static in-coupling structures at the sides of the lightguide. These beam shaping elements are placed in front of their respective light source. The elements are different in that they couple the light into the lightguide under a different angle. Thus, the desired tilt is implemented optically rather than mechanically as in the first example. By switching the light sources, input light can be entered with the desired angle into the lightguide and thereby steer the light that comes out of the lightguide.

This directional light can again be used to create views for a time-sequential autostereoscopic panel. The beam shaping structures used to couple the light into the lightguide may include either reflective (mirrors) or refractive (e.g. prisms) optical elements.

Figure 13:
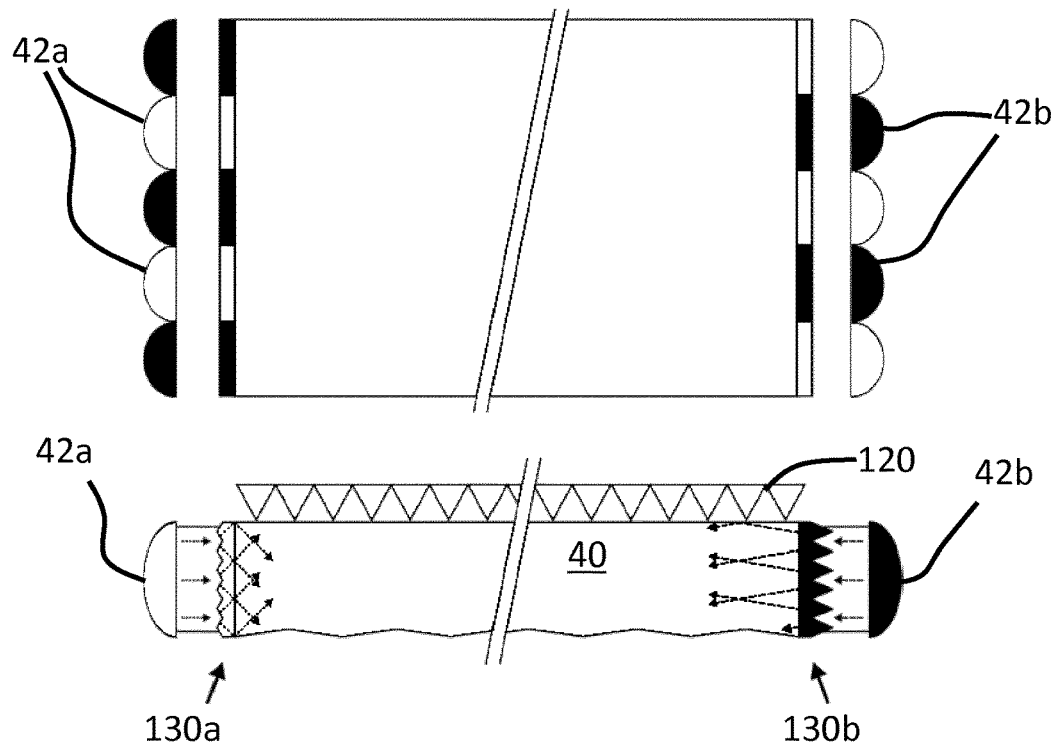
FIG. 13 shows a second more detailed example of backlight design.

In the example of FIG. 13, the beam shaping elements comprise prismatic structures. In this case two different types of in-coupling beam shaping elements are defined 130a, 130b with different top angles used to couple the light into the lightguide under different angles.

The prismatic structures typically split incoming light into two directions. The angles directed downwardly with respect to the general plane of the lightguide will couple out of the lightguide.

The light that is coupled into the lightguide under a positive angle (upwardly with respect to the general plane of the lightguide) can be coupled out after it has reflected an odd number of times inside the lightguide. Therefore, there will be only one main direction of the out-coupled light from each light source even though the prismatic structures divide each light source into two main directions.

On top of the lightguide is a prismatic light redirection arrangement 120 that is used to direct the out-coupled light to the normal.

The total number of main out-coupling directions $N_{dir}$ that can be created with this embodiment is given by the number of different types of beam shaping elements used for in-coupling of light $N_{in}$, times the number of sides at which illumination takes place $N_{sides}$:

$$N_{dir}=N_{sides} \times N_{in}$$

Figure 14:
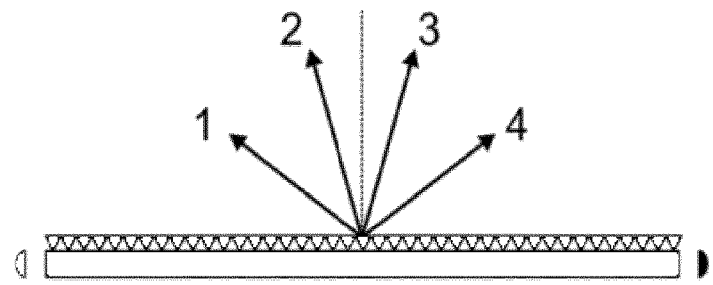
FIG. 14 shows that the designs of FIGS. 12 and 13 give four different light output angles.

In the example shown, the total number of directions is therefore four. In FIG. 14 these directions are sketched. By time-sequentially turning on the light sources that correspond to one of these four directions, four different views can be generated.

A third embodiment will now be described in more detail, with reference to FIG. 15.

In this third embodiment, the light sources for different light output directions include an active emitter matrix in combination with a lens. This combination functions as a beam steering approach which again enables the tilt or elevation angle of the light incident to the lightguide to be altered.

The each light source 42a, 42b comprises a light emitter matrix 150a, 150b, and a lens 152a, 152b supported by a mechanical support 154a, 154b with a light absorbing structure or coating 156a, 156b.

In this way instead of requiring multiple different optical elements, there may be multiple light sources per optical element. The lens will typically be a cylindrical lens with a focal length that approximately matches with the position of the light sources. As a result, the position of the light source is translated into a fan 157 that has an angle to the lightguide normal.

Figure 15:
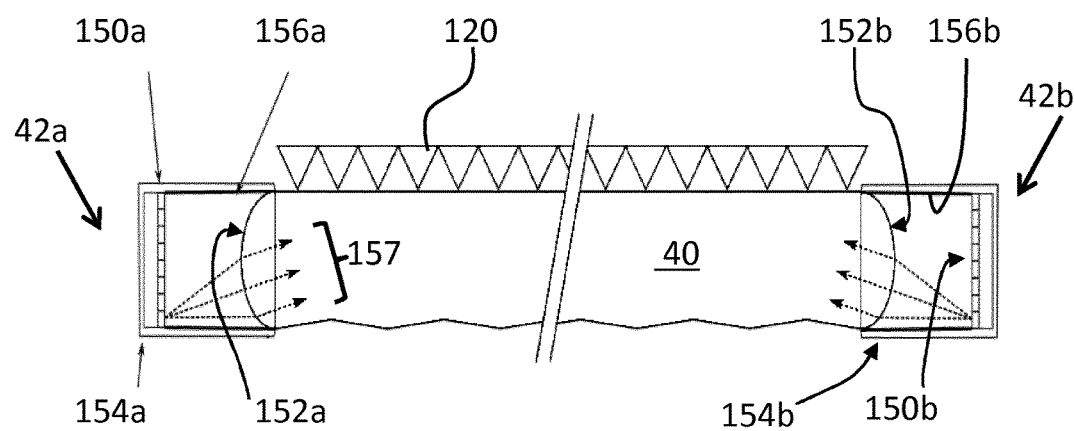
FIG. 15 shows a third more detailed example of backlight design.
Figure 15:
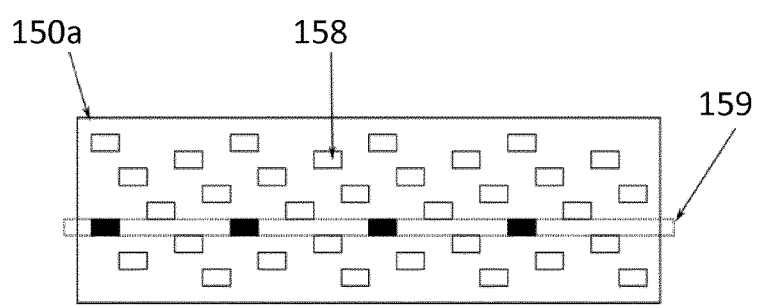

FIG. 15 shows the emitter matrix 150a in more detail and shows the individual light sources 158 such as LEDs. A line 159 of the LEDs is associated with one particular view direction.

Views can be scanned by selectively switching light sources. Other optical elements such a lenticular lens array can be used to associate multiple fans of light with a single light source. This use of a lenticular lens creates cone repetition which is desirable for non-head-tracked multi-view operation.

Figure 16:
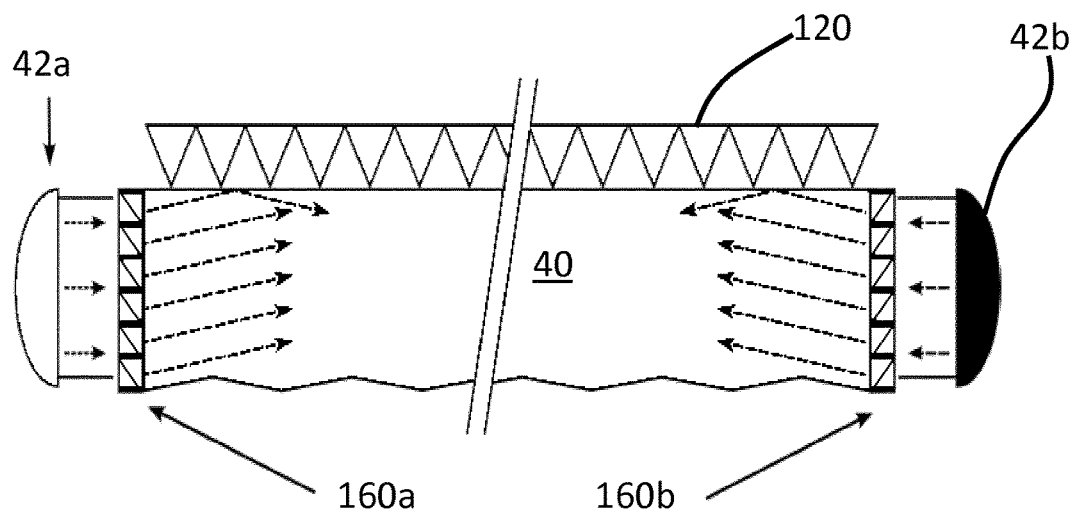
FIG. 16 shows a fourth more detailed example of backlight design.

A fourth embodiment will now be described in more detail, with reference to FIG. 16.

In this fourth embodiment, active i.e. switchable optical elements are used to implement a similar beam steering approach, which again enables the tilt or elevation angle of the light incident to the lightguide to be altered.

The light sources 42a, 42b provide a collimated output which is provided to active optical elements 160a, 160b which providing the functionality of tunable angles of light in-coupling into the lightguide, again relative to the general plane of the lightguide.

These active optical elements may be based on reflective elements (e.g. MEMS mirrors) to change light in-coupling directions or refractive elements (e.g. electrowetting prisms) for dynamic change of the light in-coupling directions.

When using electrowetting microprism arrays as in-coupling beam shaping elements, the beam deflection can be quite large, theoretically reaching up to 30°, depending on the choice of the refractive index combination of the liquids and geometry of the microprism cell. The active optical elements may be switched between the different angles with up to a kHz frequency. If the display pixel is able to operate at the same or similar rates it becomes possible to generate time-sequentially a large number of views in multiple quasi-continuous viewing directions.

The active optical elements 160a, 160b may be split into groups (for example two groups associated with each side of a lightguide). Each group may then be responsible for the generation of a subset of multiple views. This allows each of the active cells to operate in the reduced angular range and should result in reduction of switching time.

The internal lightguide out-coupling features may have different designs.

A first set of examples is based on total internal reflection. They re-direct the light to the front plane by total internal reflection (TIR), where the light is extracted out of the lightguide.

In order to maximize the angular range of rays extracted from the lightguide the preferred angle β at the base of the prism (i.e. the angle of the reflecting facet with respect to the general plane of the lightguide) should obey the relation:

$$\cos(2\beta)=1/n_{lg}$$

where $n_{lg}$ is the refractive index of the material of the lightguide (for the prismatic recess in contact with air). More generally this condition transforms to:

$$\cos(2\beta) = n_o/n_{lg},$$

when the light out-coupling structure is in contact with another medium with refractive index $n_o$.

This maximizes the angular range of rays which can be extracted from the lightguide. If $\beta=0$ (no extraction structures), light will not be extracted at all, for an intermediate values of $\beta$ (i.e. $\cos(2\beta) > n_o/n_{lg}$), the light distribution out of the lightguide will have some intermediate width, and for $\beta = \{\cos^{-1}(n_o/n_{lg})\}/2$ the width of the angular distribution which can be extracted is about 90 degrees, as shown in FIG. 6.

A second set of examples is based on the extraction features which have a reflecting surface (i.e. regardless of the angle of incidence). The light out-coupling structures at the backplane of the lightguide are for example coated with a light reflective coating (e.g. metal). Because there is no longer the constraint that total internal reflection is needed at the out-coupling structure, it is possible to select from a broader range of angles $\beta$ (the base of the out-coupling prism).

Figure 17:
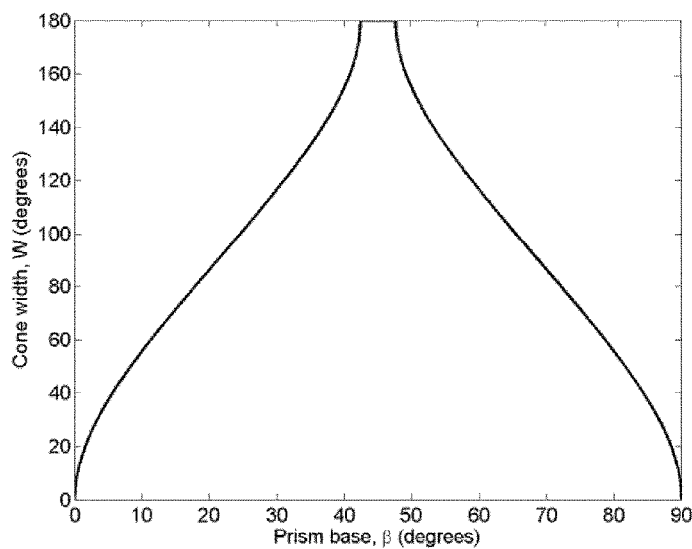
FIG. 17 is used to show how the design of the light out-coupling structures of the lightguide can be optimized to provide the largest output cone width.

The maximum width of the out-coupled light as a function of $\beta$ has been calculated and the result is shown in FIG. 17, which plots the light output width (y-axis) against the prism base angle $\beta$ (x-axis). In order to maximize the angular width of the outgoing light $\beta$ can be selected to be:

$$\sin^{-1}[n_{amb}/n_{lg}] \leq \beta \leq (90° - \sin^{-1}[n_{amb}/n_{lg}])$$

For PMMA this amounts to a value of $\beta$ between 42 and 48 degrees. For these values of $\beta$, the out-coupled light can be in the range of −90 degrees up to 90 degrees, depending on the direction of the in-coupled light.

With the lightguide made of PMMA material (n=1.48) and out-coupling structures based on prismatic grooves where light re-direction occurs via total internal reflection, the apex angle of the internal light out-coupling prisms will be optimized at 132 degrees (so that $\beta=44$ degrees) to satisfy the condition of $\cos(2\beta)=1/n$ as outlined above.

FIG. 17 is for a lightguide made out of PMMA in air. There is a small range of $\beta$ for which the cone width is maximal at 180 degrees.

Some examples above make use of a light redirection arrangement in the form of a redirection film 120 over the lightguide. This is needed for example if the (direct) light output from the backlight unit is confined in a range of angles (e.g. 0° to 90°) from the normal. This is the case if the output light is clipped on one side. This angular light distribution may be transformed into a distribution which is centered around the normal direction, which enable the directional backlight unit to be applied more straightforwardly to multi-view displays.

An additional optical film comprising structures for re-direction of light towards the normal direction is placed on the top of the lightguide. The structures may be prismatic elements with an apex angle which can be chosen based on the refractive index of the material (for instance around 55° for PMMA), and are oriented towards the lightguide.

Compared to the examples of out-coupling structure with a reflector coating, the prismatic groove light out-coupling structures in the lightguide in the examples based on total internal reflection case can have smaller base angle. As a result, the out-coupling structures are flatter and can be easier to manufacture.

Adding re-direction prisms on the top of the lightguide allows the outgoing angular ray distribution to be converted into the distribution centered around the normal direction to the backlight. An optimum apex angle of 55 degrees achieves this redirection. With this design, by tuning the angles of prisms on the side of the lightguide, the outgoing beam can for example be scanned in the range ±20° from the normal. This relationship between the prism angle and the beam direction is shown in FIG. 9 discussed above, and it shows the output beam direction being adjustable in the approximate range 90±20° degrees.

A fifth embodiment will now be described in more detail, with reference to FIG. 18.

In this fifth embodiment active optical elements are used in combination with a switchable light source in order to mask view transitions.

A possible disadvantage of some implementations of active optical elements is the time that is required to switch between any two optical modes. During this transition, light sources should be turned off to avoid visible ghosting or a mediocre black level. The switching time of the optical elements may result in a low view count or perceptible flicker and low brightness.

The switching time can be hidden by a scanning backlight approach where a number of light source and optical element combinations act in synchronism to enable a flicker free operation. Each combination is in either a "transition" or an "on" state.

Figure 18:
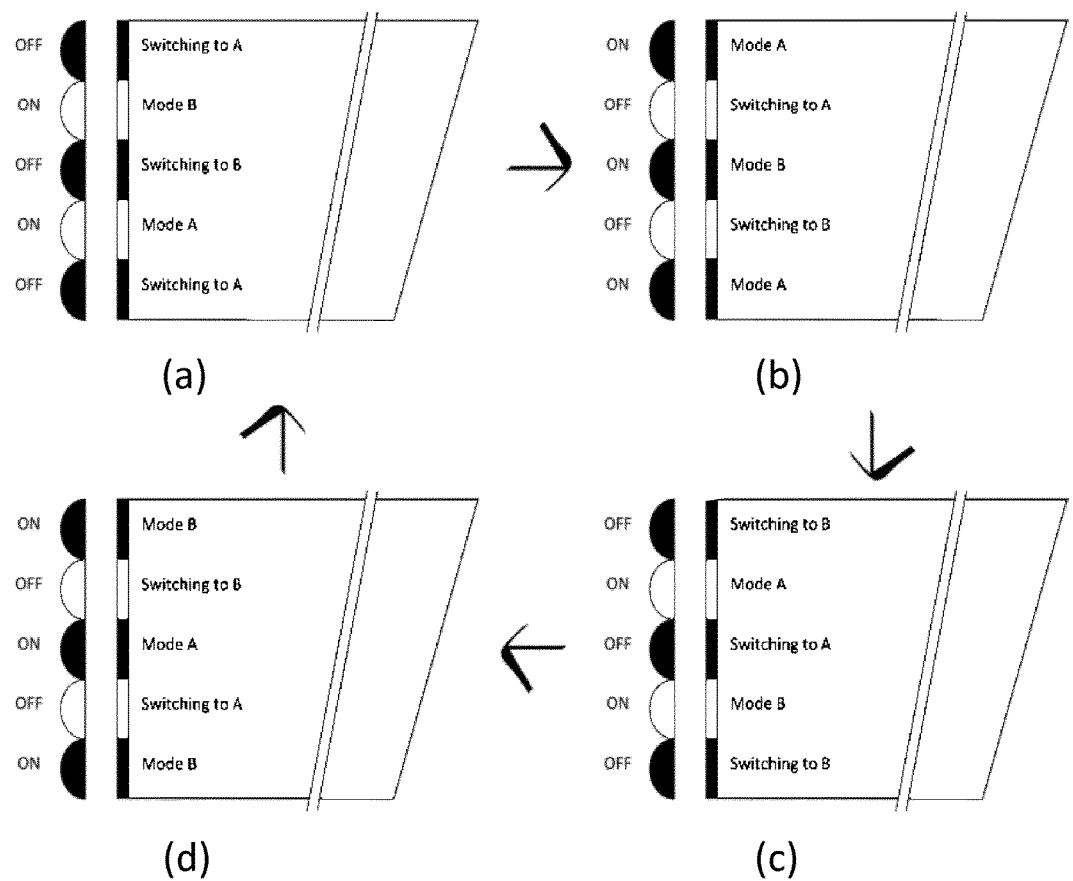
FIG. 18 shows a possible operation sequence for the backlight in order to mask a perceptible flicker during view transition.

The example of FIG. 18 has a backlight with four sub-frames shown sequentially in FIGS. 18(a) to 18(d). In each sub-frame two views or modes "A" and "B" are active. Modes "A" and "B" could for instance correspond to the left and the right eye of a single viewer or to viewer "A" and "B". Different views may correspond to a different viewpoint in each frame.

The labels ON or OFF denote whether a light source is on or off. Each light source presents its output to a collimator and then a steerable optics system. Each light source follows a sequence of Mode A (light source ON), Switching to Mode B (light source OFF), Mode B (light source ON), Switching to Mode A (light source OFF). In this way, light sources are only on when the beam steering system is ready, and by staggering the light sources there is no discontinuity.

This arrangement enables a reduction in flicker.

In the system of FIG. 18 the light of the "Mode A" and "Mode B" light sources is arranged not to mix. This can be achieved by partial collimation of the light sources in the plane of the lightguide, or there could be multiple lightguide strips such that light is confined within the strips by total internal reflection on the strip side walls.

A perfectly collimated backlight unit will have the same light output direction from all the areas of the backlight. When the angular light distribution of a backlight is sufficiently narrow, such that it is smaller than the field of view of a display, this can create an unwanted effect that light from not all the areas of a display can reach the eyes of the observer (some parts of a display will appear dark).

For common lenticular-based autostereoscopic displays, this so-called viewpoint correction is realized by a mismatch between the pitch of display sub-pixels and lenticular lens pitch. In this way, light from the pixels at the sides of a display is directed at different directions with respect to light from the center of the display panel. For a directional backlight unit this correction of an angular distribution can be realized either at the level of a re-direction optical foil or (if no foil is used) at the level of the light out-coupling structures within the lightguide. The correction requires spatially selective adjustments of structure geometries (angle of redirection prisms or other light out-coupling structures) along the length of the backlight.

The purpose is to ensure that the light output angles from the top face of the backlight (which may or may not include a light redirection film) vary as a function of position over the top face such that light reaches a common view point from all positions of the top face. This common view point will be different for the two modes of the backlight, but it will be at the same distance from the display, so that one viewpoint is the expected location of one eye of a user and the other view point is the expected location of the other eye of the user.

For the range of display dimensions, a typical field of view is within 7-12 degrees (half angle). Optical simulations have been performed for a design, where the angular distribution correction is realized at the level of the light re-direction film. The angles of prismatic structures are modified as a function of their distance from the center line of the backlight. The angular correction of the outgoing light direction at the sides of a backlight was chosen to be ±10° (light is tilted towards the viewer).

The beam-sweeping functionality of a backlight for this design with a modified light re-direction plate was checked by optical modeling to be in the same range as presented in FIGS. 9 to 11. It has been verified that the light rays from the sides and the center of a backlight converge into the same viewing region, providing an effective viewpoint correction for the whole angular tuning range of the backlight (±20°).

Some display systems make use of head-tracking of viewer position. In such a system, driving of active optical elements can be adjusted to generate views at a specific direction for best comfort for the specific viewer position (or multiple viewers).

The directional backlight component can be applied to autostereoscopic multi-view 3D displays, and for displays with privacy mode.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device, comprising:
a lightguide having a top face and a bottom face, and opposite first and second side edges extending between the top face and the bottom face,
wherein the top face is parallel to the bottom face, and wherein light is output from the top face;
a light source arranged to provide the light into the lightguide at one or both of the opposite side edges; and
an array of light out-coupling structures formed at the top face or the bottom face of the lightguide to redirect the light so that the light escapes from the lightguide at the location of the light out-coupling structures,
wherein the light source is controllable to provide a selected one of at least a first light output and second light output into the lightguide,
wherein the first light output and the second light output are each at least partially collimated,
wherein an angular direction of elevation is defined with respect to a plane of the top face and across a direction from the first side edge of the lightguide to the second side edge of the lightguide,
wherein the light source is arranged to provide the first light output and the second light output into the lightguide with different angular directions of elevation than each other, and
wherein the first light output entering into the lightguide results in the light exiting the top face of the lightguide at a first range of angles, and the second light output entering the lightguide results in the light exiting the top face of the lightguide at a second range of angles, wherein the first range of angles is different than the second range of angles.

2. The device of claim 1, wherein the first light output and the second light output are each collimated in a plane extending between the side edges of the lightguide.

3. The device of claim 1, wherein the light out-coupling structures comprise prismatic strips which extend parallel to the side edges of the lightguide.

4. The device of claim 1,
wherein the light source comprises at least a first light source and a second light source,
wherein the first light source is mounted at first source angle with respect to the plane of the top face of the lightguide and the second light source is mounted at second source angle respect to the top face of the lightguide,
wherein the first source angle is different than the second source angle.

5. The device of claim 1,
wherein the light source comprises at least a first light source and a second light source,
wherein each light source has an associated beam shaping element,
wherein each beam shaping element is arranged to set a corresponding light output angle into the lightguide,
wherein the light output angle is defined with respect to the plane of the top face of the lightguide.

6. The device of claim 5, wherein each of the beam shaping elements comprise:
static prismatic structures designed for a specific light output angle with respect to the plane of the top face of the lightguide.

7. The device of claim 1,
wherein the light source comprises at least first a first light source and a second light source,
wherein each light source comprises a light emitter array and an output lens.

8. The device of claim 1, further comprising a light redirection structure over the top face of the lightguide providing a redirection of the light output from the top face of the lightguide.

9. The device of claim 1, wherein the light output angles from the top face vary as a function of position over the top face such that light reaches a common view point from all positions of the top face.

10. The device of claim 1, further comprising a display panel having an array of display pixels,
wherein the display panel is illuminated by the light exiting from the waveguide.

11. The device of claim 10, further comprising a controller,
wherein the controller is arranged to operate the display in a first mode and a second mode:
wherein the first light output is provided into the lightguide and the display panel is controlled to display a first image in the first mode;

wherein the second light output is provided into the lightguide and the display panel is controlled to display a second image in the second mode, and wherein the controller is arranged to implement the first and second modes time-sequentially.

12. A method, comprising:

providing light from a light source into a lightguide which has top face and a bottom face, and opposite first and second side edges extending between the top face and the bottom face, wherein the top face is parallel to the bottom face, wherein the light is provided to at least one opposite side edge, and wherein the light source provides the light into the lightguide via at least a first light output and a second light output;

using an array of light out-coupling structures formed at the top face or bottom face of the lightguide to redirect the light so that the light escapes from the lightguide from the top face at locations of the light out-coupling structures;

controlling an angular direction of elevation of the light entering the lightguide, wherein the angular direction of elevation is defined with respect to a plane of the top face of the lightguide across a direction from the first side edge of the lightguide to the second side edge of the lightguide, wherein the light source is arranged to provide the first light output and the second light output into the lightguide with different angular directions of elevation than each other, and wherein the first light output entering the lightguide results in the light exiting the top face of the lightguide at a first range of angles, and the second light output entering the lightguide results in the light exiting the top face of the lightguide at a second range of angles, wherein the first range of angles is different than the second range of angles.

13. The method of claim 12, further comprising:

providing the light from the lightguide to a display panel; and controlling the image displayed by the display panel, wherein the display device is operated in a first mode and a second mode:

wherein the first light output enters the lightguide and the display panel is controlled to display a first image in the first mode;

wherein the second light output enters the lightguide and the display panel is controlled to display a second image in the second mode, and wherein the first and second modes are provided time-sequentially.

14. The device of claim 1, wherein the cross section of the lightguide, in the plane of the top face, is a rectangle.

15. The device of claim 3, wherein the prismatic strips extend parallel to the side edges.

16. The device of claim 5, wherein each of the beam shaping elements comprise:

dynamic beam shaping elements arranged to provide a specific light output angle with respect to the plane of the top face of the lightguide.

* * * * *